United States Patent [19]
Coil

[11] 3,823,914
[45] July 16, 1974

[54] CHAIN ACCESSORY TOOLS
[76] Inventor: Frederick J. Coil, 109 Latham Trailer Cts., Latham, N.Y. 12110
[22] Filed: Apr. 9, 1973
[21] Appl. No.: 349,306

[52] U.S. Cl. ............................................. 254/78
[51] Int. Cl. ............................................ B66f 3/00
[58] Field of Search ............ 254/68, 73, 74, 75, 77, 254/78; 24/216

[56] References Cited
UNITED STATES PATENTS
| | | | |
|---|---|---|---|
| 2,049,710 | 8/1936 | Livingston | 254/74 |
| 3,261,588 | 7/1966 | Jensen et al. | 254/74 |
| 3,712,588 | 1/1973 | Coil | 254/78 |

FOREIGN PATENTS OR APPLICATIONS
| | | | |
|---|---|---|---|
| 499,466 | 1/1954 | Canada | 254/78 |

Primary Examiner—Othell M. Simpson

[57] ABSTRACT

Discloses chain accessory tools for use with a chain accessory device that is operable for mounting a chain to be repaired, and for tightening same and at the same time rendering slack a portion of the chain for purposes of repair, said chain accessory tools, as carried for operative use by the chain accessory device are in a condition of bilateral symmetry and have similar construction. The chain accessory tools have hollow cylindrical elements and hooks. The hollow cylindrical elements are carried in fixed relationship by the chain guides of the chain accessory device, and the hooks are adapted to operatively engage portions of the chain to be repaired.

10 Claims, 12 Drawing Figures

3,823,914

CHAIN ACCESSORY TOOLS

This invention relates to chain accessory tools for use with a chain accessory device in mounting a chain to be repaired, and for tightening same and at the same time rendering slack a portion of the chain for purposes of repair.

On July 12, 1971, applicant Frederick J. Coil, applied for United States Letters Patent for his invention entitled "Chain Accessory Device," U.S. Pat. Ser. No. 161,746 and, on Jan. 23, 1973, was granted U.S. Pat. No. 3,712,588.

The object of this invention is to facilitate the full range of use of the "Chain Accessory Device," U.S. Pat. No. 3,712,588, for all known types of industrial chains including timing-type chains, conveyer-type chains, double-strand type chains, etc. by providing chain accessory tools that are adapted to be complementally utilized with the "Chain Accessory Device" to facilitate repair of all known types of industrial chains.

This object and other objects of the invention should be discerned and appreciated from the detailed specification taken in conjunction with the drawings, wherein like reference numeral refer to similar parts throughout the several views, in which:

FIG. 1 is a perspective view of the prior art "Chain Accessory Device," U.S. Pat. No. 3,712,588;

Figure 1:
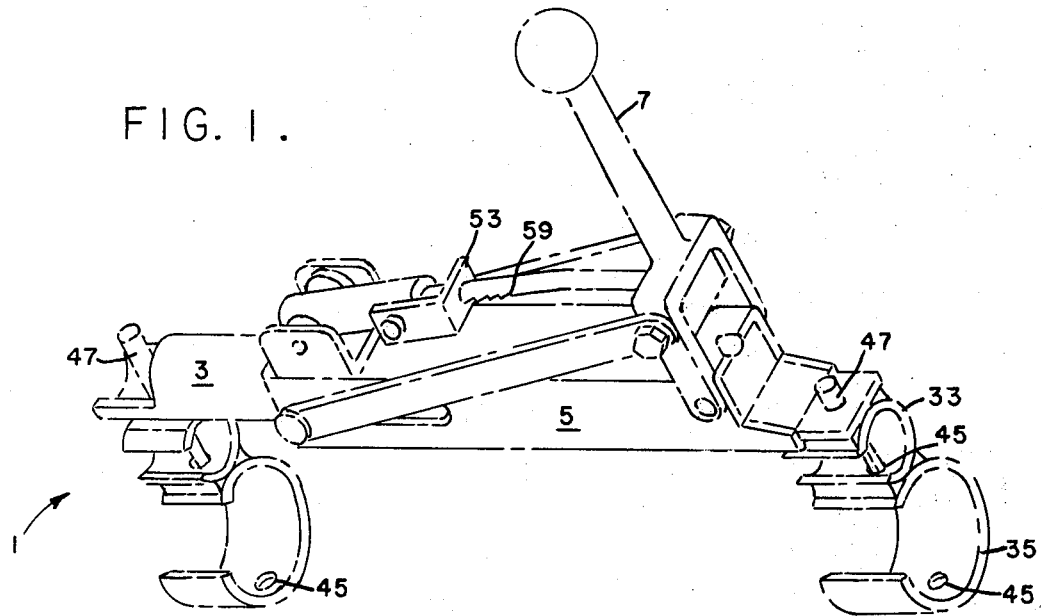
Figure 2:
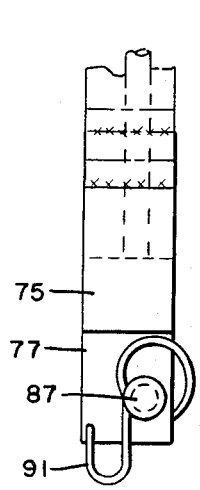
FIG. 2 is a side view of the chain accessory tool.
Figure 3:
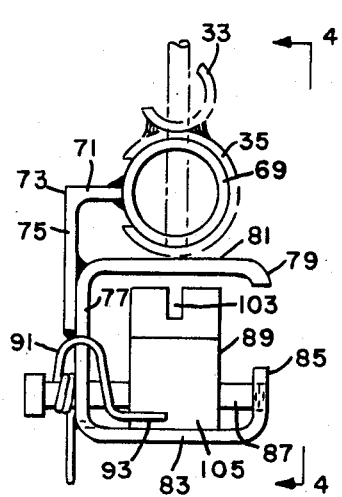
FIG. 3 is a view taken in the direction of the arrows 3 — 3 in FIG. 2.

To facilitate the understanding of the invention, a nomenclature list is hereby provided:

NOMENCLATURE

| | |
|---|---|
| 61 | timing-type chain |
| 63 | double-strand type chain |
| 65 | accessory tool |
| 67 | accessory tool |
| 69 | hollow cylindrical element |
| 71 | small leg of L-shaped element 73 |
| 73 | L-shaped element |
| 75 | long leg of L-shaped element 73 |
| 77 | left lateral side of G-shaped element 79 |
| 79 | G-shaped element |
| 81 | top leg of G-shaped element 79 |
| 83 | bottom leg of G-shaped element 79 |
| 85 | right leg of G-shaped element 79 |
| 87 | cross pin |
| 89 | bifurcated hook |

-Continued
NOMENCLATURE

| | |
|---|---|
| 91 | spring |
| 93 | ear of spring 91 |
| 95 | middle plate of chain 61 |
| 97 | teeth-like, side plate of chain 61 |
| 99 | pintle pin of chain 61 |
| 101 | end portion of bifurcated hook 89 |
| 103 | slot in bifurcated hook 89 |
| 105 | cam-configured bottom of hook 89 |
| 107 | middle plate of chain 63 |
| 109 | side plate of chain 63 |
| 111 | pintle pin of chain 63 |
| 113 | conveyer-type chain |
| 115 | accessory tool |
| 117 | accessory tool |
| 119 | hollow cylindrical element |
| 121 | U-shaped hook |
| 123 | top leg of U-shaped hook 121 |
| 125 | side leg of U-shaped hook 121 |
| 127 | bottom leg of U-shaped hook 121 |
| 129 | arcuate terminal portion of bottom leg 127 |
| 131 | semi-circular portion of terminal portion 129 |
| 133 | roller of chain 113 |
| 135 | side plate of chain 113 |
| 137 | pintle pin of chain 113 |
| 139 | upstanding guide plate of chain 113 |
| 141 | depending guide plate of chain 113 |
| 143 | laterally extending conveyer-mounting plate of chain 113 |

In FIG. 1 of the drawings, reference numeral 1 generally refers to the prior art "Chain Accessory Device" in its position preparatory to its operative use. Briefly, and employing the same nomenclature found in U.S. Pat. No. 3,712,588, the "Chain Accessory Device" is utilized for mounting a chain to be repaired, and for tightening same and at the same time rendering slack a portion of the chain for purposes of repair. A barrel slide member 3 is slidable within a main-body member 5, with both members having depending, cylindrically configured, upper 33 and lower 35 chain guides accommodating, respectively, a small chain or a large chain. Aligned holes 45 in the slide member 3, main-body member 5 and chain guides 33 and 35 receive chain pins 47 to engage and retain the chain accommodated. Relative rectilinear movement of the barrel slide member 3 and main-body member 5 is effected by rotary movement of an operatively engaged, bifurcated lever 7 to tighten the accommodated chain and at the same time to render the portion of the accommodated chain between the chain pins 47 slack for purposes of repair. As a safety feature, the lever 7 is rotatable beyond its position of greatest force application to positive-lock position. An added safety feature is provided by a pawl 53 rententively engageable with ratchet teeth 59.

Figure 5:
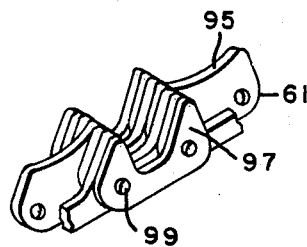
FIG. 5 is a perspective view of the timing-type chain.
Figure 12:
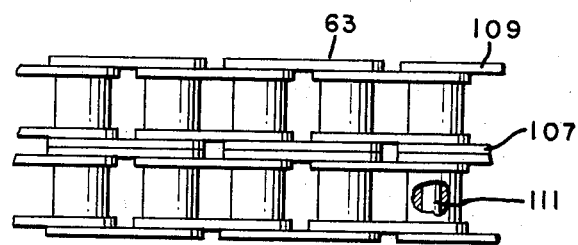
FIG. 12 is a view of the double-strand type chain.

In utilizing "Chain Accessory Device" 1 with the timing-type chain 61 shown in FIG. 5 and the double-strand type chain 63 shown in FIG. 12, chain accessory tools 65 and 67 are employed. Tool 65 is carried by lower chain guide 35 on the right side of "Chain Accessory Device" 1, as viewed in FIGS. 1 and 6, and tool 67 is carried by lower chain guide 35 on the left side.

Tool 65 has a hollow cylindrical element 69 fixed to the small leg 71 of an inverted L-shaped element 73 whose long leg 75 is fixed to the left lateral side 77 of a G-shaped element 79 having a top leg 81, bottom leg 83 and right leg 85 upstanding from bottom leg 83, as shown.

Figure 4:
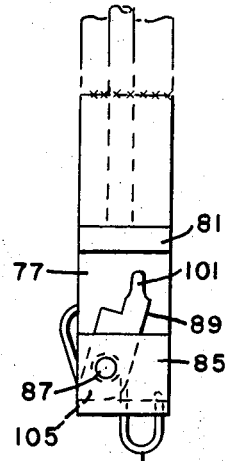
FIG. 4 is a view taken in the direction of the arrows 4 — 4 in FIG. 3.

Cross pin 87 freely carries a bifurcated hook 89. Cross pin 87 is transversely disposed through and carried in fixed relationship by left lateral side 77 and right leg 85. Spring 91, mounted on cross pin 87, has an ear 93 engaged with the lower portion of bifurcated hook 89 to constrain bifurcated hook 89 in a direction of clockwise movement as viewed in FIG. 4. Hollow cylindrical element 69 is complementally received by lower chain guide 35. Aligned holes formed through hollow cylindrical element 69 correspond to the aligned holes in lower chain guide 35. A chain pin of greater length than chain pin 47 is disposed through the aligned holes 45 and corresponding, aligned holes in hollow cylindrical element 69 to secure accessory tool 65 to lower chain guide 35.

Figure 6:
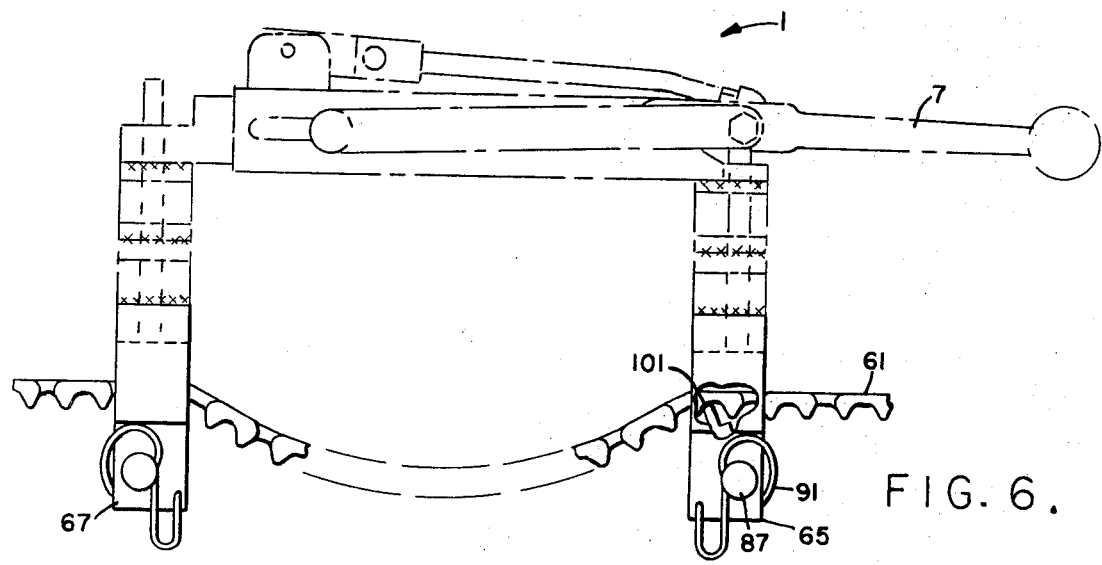
FIG. 6 is a view of the chain accessory tools employed with the prior art "Chain Accessory Device" in operative use with the timing-type chain shown in FIG. 5.
Figure 7:
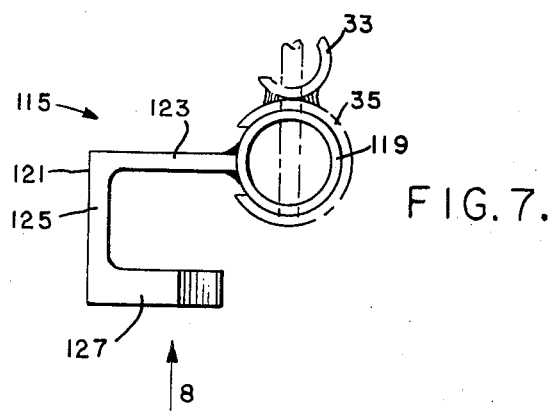
FIG. 7 is an end view of an embodiment of another chain accessory tool.
Figure 8:
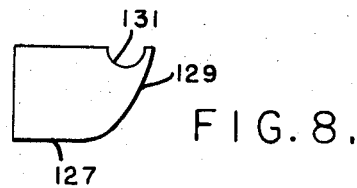
FIG. 8 is a view taken in the direction of the arrow 8 in FIG. 7.

Tool 67, similarly carried by lower chain guide 35 on the left side of "Chain Accessory Device" 1, is disposed in a condition of bilateral symmetry with respect to tool 65, similarly includes a hollow cylindrical element, L-shaped element, G-shaped element, cross pin, bifurcated hook and spring, and as such and in such condition of bilateral symmetry, the bifurcated hook 89 of tool 67 is constrained to maintain a direction of counterclockwise movement, as viewed in FIG. 6.

Timing-type chain 61, as shown in FIG. 5, has middle plates 95 and teethlike, side plates 97 linked together by pintle pins 99. To repair the timing-type chain 61, the "Chain Accessory Device" 1 is placed in its position preparatory to operative use as is shown in FIG. 1, then the chain 61 is suitably emplaced within accessory tools 65 and 67 such that the end portions 101 of bifurcated hooks 89 engage the teeth-like, side plates 97, as shown in FIG. 6 or such that the slots 103 of bifurcated hooks 89 can be reciprocated by hand against the spring bias to provide clearance for emplacement of chain 61 and thereafter bifurcated hooks hand-released, emplacement of chain 61 is facilitated. Thereafter, as lever 7 is rotated clockwise to the right, as viewed in FIGS. 1 and 6, the increasing tension on chain 61 to the right of tool 65 and to the left of tool 67 locks bifurcated hooks 89 in place for reason of the wedging action of the cam-configured bottoms 105 of bifurcated hooks 89 against the bottom legs 83 of G-shaped elements 79. Complete clockwise rotary movement of lever 7 to its positive-lock position, as shown in FIG. 6, provides and maintains sufficient slackness in chain 61 between tools 65 and 67 for purposes of its repair.

Double-strand type chain 63, shown in FIG. 12, has middle plates 107 and side plates 109 linked together by pintle pins 111 freely mounting rollers. Emplacement of chain 63 within tools 65 and 67 for purposes of repair, followed by disposition of lever 7 to its positive-lock position, is similar to the description afforded with respect to the emplacement of the timing-type chain 61 within tools 65 and 67 for purposes of repair, followed by the disposition of lever 7 to its positive-lock position.

Figure 9:
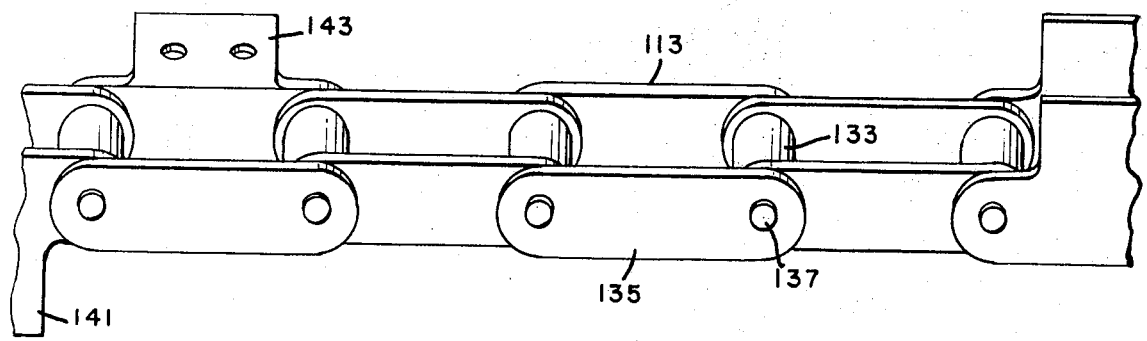
FIG. 9 is a perspective view of the conveyer-type chain.
Figure 10:
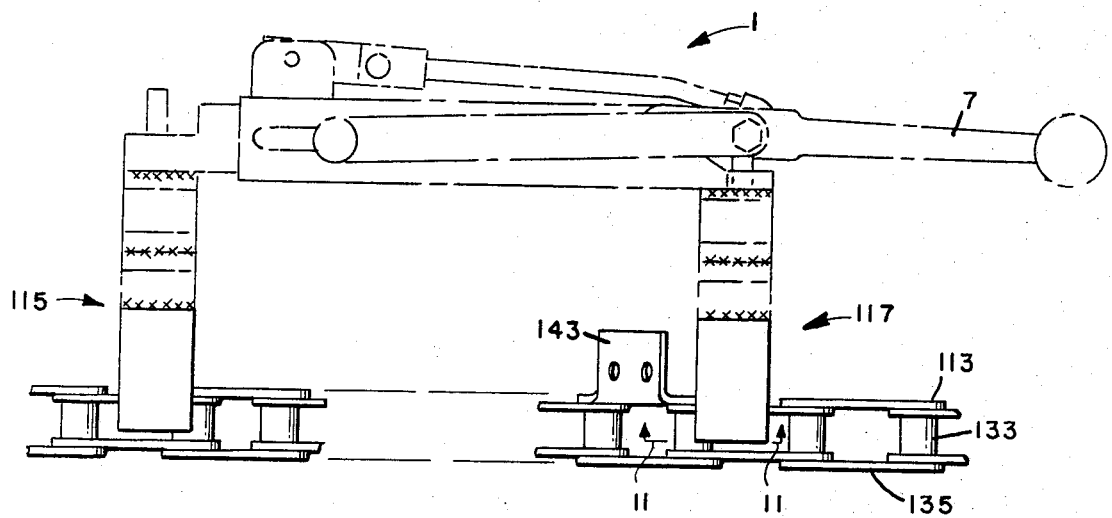
FIG. 10 is a view of the chain accessory tools employed with the prior art "Chain Accessory Device" in operative use with the conveyer-type chain shown in FIG. 9.
Figure 11:
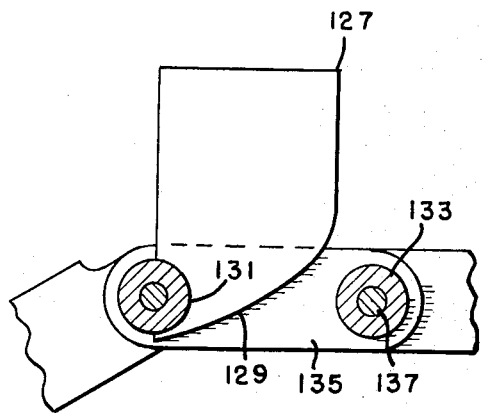
FIG. 11 is a view taken in the direction of the arrows 11 in FIG. 10.

In utilizing the "Chain Accessory Device" 1 with the conveyer-type chain 113, shown in FIGS. 9 and 11, Chain Accessory Tools 115 and 117 are employed. Tool 115 is carried by lower chain guide 35 on the left side of "Chain Accessory Device" 1, as viewed in FIG. 10, and tool 117 is carried by the lower chain guide 35 on the right side.

Tool 115 has a hollow cylindrical element 119 fixed to a U-shaped hook 121. Top leg 123 transversely extends from hollow cylindrical element 119, side leg 125 normal to top leg 123 depends from top leg 123, and bottom leg 127 extends normal to and from side leg 125. The terminal portion 129 of bottom leg 127 is arcuate in configuration and has a semi-circular portion 131 complemental to the roller 133 of conveyer-type chain 113. Aligned holes formed through hollow cylindrical element 119 correspond to the aligned holes 45 in lower chain guide 35. A chain pin of greater length than chain pin 47 is disposed through the aligned holes 45 and corresponding, aligned holes in hollow cylindrical element 119 to secure accessory tool 115 to lower chain guide 35.

Tool 117, similarly carried by lower chain guide 35 on the right side of "Chain Accessory Device" 1, is disposed in a condition of bilateral symmetry with respect to tool 115, and similarly includes a hollow cylindrical element, U-shaped hook with its top leg, side leg, bottom leg, arcuate terminal portion and semi-circular portion.

Conveyer-type chain 113, as shown in FIGS. 9 and 11, has side plates 135 linked together by pintle pins 135 freely mounting the rollers 133 interposed between side plates 135. In spaced apart relationship on chain 113 are upstanding guide plates 139, depending guide plates 141 and laterally extending, conveyer-mounting plates 143, as shown, and, for reason of the space plates 139, 141 and 143 occupy beyond that occupied by side plates 135, renders difficult any repair of conveyer-type chain 113. However, tools 115 and 117 are designed and constructed to be non-interferingly disposed and emplaced on conveyer-type chain 113 for purposes of repair while chain 113 remains in position on the conveyer with which chain 113 is operatively utilized.

To repair the conveyer-type chain 113, the "Chain Accessory Device" 1 is placed in its position preparatory to operative use as is shown in FIG. 1. Assuming the "Chain Accessory Device" 1 in FIG. 1 lies within the $yz$ plane of the conventional $xyz$ planes utilized in solid analytic geometry, the "Chain Accessory Device" 1 is disposed towards the negative $x$ axis to assume the position coplanar with the $xy$ plane corresponding to its position shown in FIG. 10, then the tools 115 and 117 are suitably emplaced such that their semicircular portions 131 complementally receive and engage rollers 133 of chain 113. Thereafter, as lever 7 is rotated clockwise to the right, as viewed in FIGS. 1 and 10, the increasing tension on chain 113 will increasingly slacken chain 113 between tools 115 and 117. Complete clockwise rotary movement of lever 7 to its positive-lock position, as shown in FIG. 10, provides and maintains sufficient slackness in chain 113 between tools 115 and 117 for purposes of its repair.

Having thusly described my invention, I claim:

1. Chain accessory tools for use with a chain accessory device; said chain accessory device being operable for mounting a chain to be repaired, and for tightening same and at the same time rendering slack a portion of the chain for purposes of repair, said chain accessory device comprising a main-body member, slide member, lever, arms, chain guides and chain pins, said main-body member slidably receiving therein said slide member, said main-body member pivotally mounting said lever, said slide member and lever pivotally and operatively mounting said arms such that upon operative movement of said lever said slide member is slidably moved within said main-body member, said main-body member and slide member carrying said chain guides, said chain guides mounting and accommodating a chain to be repaired, said main-body member, slide member and chain guides having aligned holes receiving said chain pins for engagement with said chain, said lever being operative in one direction of its movement to tighten said mounted and accommodated chain and at the same time render slack a portion of said chain between said engaged chain pins for purposes of repair; said chain accessory tools, as carried for operative use by said chain accessory device being in a condition of bilateral symmetry and having similar construction, said chain accessory tools having hollow cylindrical elements detachably and fixedly mounted in said chain guides by pin means in said aligned holes and hook means carried by said cylindrical member, said hooks being adapted to operatively engage portions of the chain to be repaired for mounting the chain to be repaired, and for subsequently tightening same and at the same time rendering slack a portion of the chain for purposes of repair.

2. Chain accessory tools in accordance with claim 1, wherein said hooks are configured to operatively engage timing-type and double-strand type chains.

3. Chain accessory tools in accordance with claim 1, wherein said chain accessory tools have G-shaped elements depending from said cylindrical elements and have cross pins mounting said hooks.

4. Chain accessory tools in accordance with claim 1, wherein said chain accessory tools have G-shaped elements depending from said cylindrical elements and have cross pins mounting said hooks, and wherein said cross pins carry springs constraining said hooks to unidirectional movement.

5. Chain accessory tools in accordance with claim 1, wherein said chain accessory tools have L-shaped elements attached to and depending from said hollow cylindrical elements, wherein said chain accessory tools further have G-shaped elements depending from said L-shaped, wherein said G-shaped elements have cross pins mounting said hooks, and wherein said cross pins carry springs constraining said hooks to unidirectional movement.

6. Chain accessory tools in accordance with claim 1, wherein said chain accessory tools have G-shaped elements depending from said cylindrical elements and have cross pins mounting said hooks, wherein said G-shaped elements have bottom legs, wherein said hooks have cam-configured bottoms, and wherein said cam-configured bottoms are engageable with said bottom legs of said G-shaped elements to effect wedging action therebetween.

7. Chain accessory tools in accordance with claim 1 wherein said chain accessory tools have G-shaped elements depending from said cylindrical elements and have cross pins mounting said hooks, wherein said cross pins carry springs constraining said hooks to unidirectional movement, wherein said G-shaped elements have bottom legs, wherein said hooks have cam-configured bottoms, wherein said cam-configured bottoms are engageable with said bottom legs of said G-shaped elements to effect wedging action therebetween, and wherein said springs constrain said hooks to unidirectional movement for such wedging action.

8. Chain accessory tools in accordance with claim 7, wherein said chain accessory tools have L-shaped elements attached to and depending from said cylindrical elements elements, and wherein said L-shaped elements carry said G-shaped elements.

9. Chain accessory tools in accordance with claim 1, wherein said hooks are configured to operatively engage a conveyer-type chain.

10. Chain accessory tools in accordance with claim 1, wherein said hooks are U-shaped, and wherein said hooks have semi-circular portions complemental to the rollers of a chain for receiving said rollers in operative engagement therewith.

* * * * *